M. F. HOLBROOK.
COMBINATION LEVEL.
APPLICATION FILED JAN. 14, 1908. RENEWED OCT. 19, 1909.
955,799.
Patented Apr. 19, 1910.
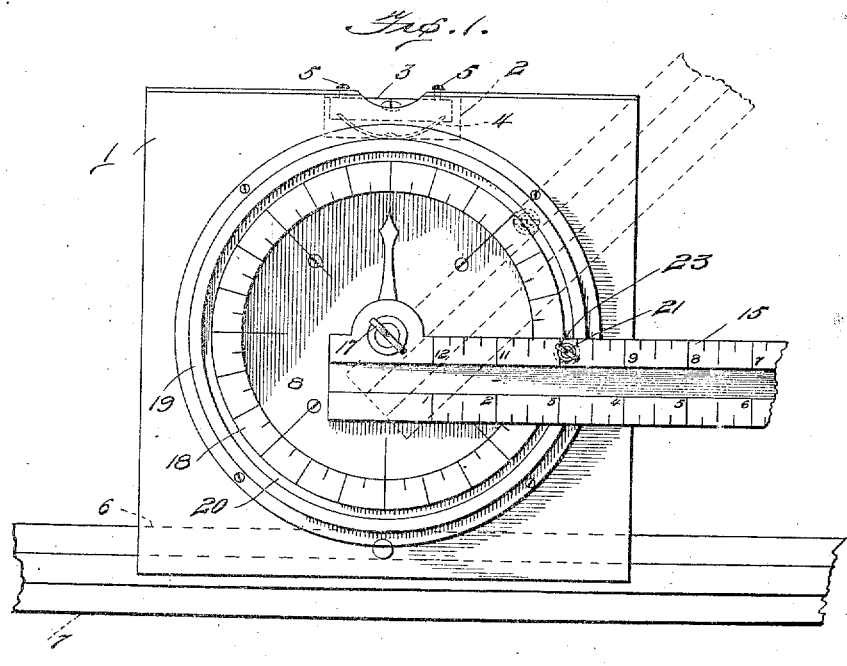
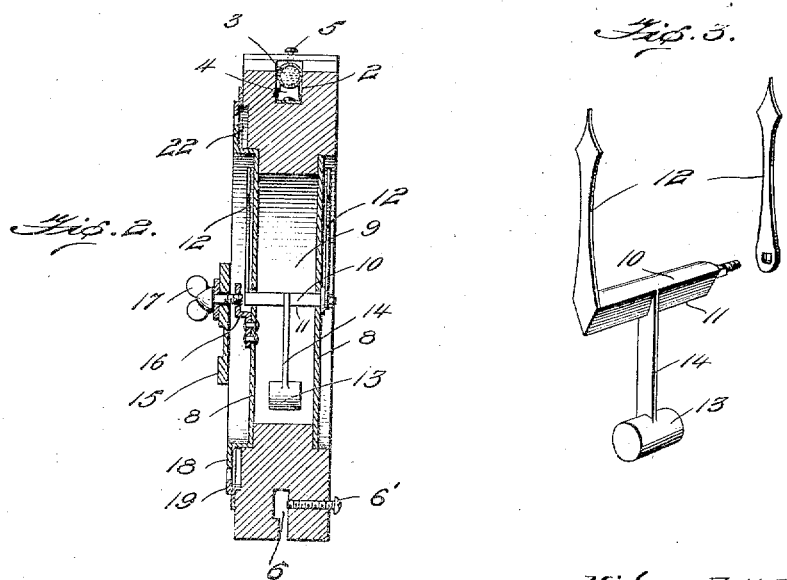
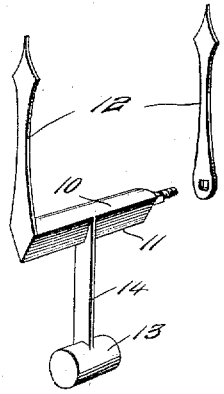
WITNESSES:
Milo F. Holbrook
INVENTOR.
BY
ATTORNEY.

UNITED STATES PATENT OFFICE.

MILO FRANKLIN HOLBROOK, OF LONGVIEW, TEXAS.

COMBINATION-LEVEL.

955,799.　　　　Specification of Letters Patent.　Patented Apr. 19, 1910.

Application filed January 14, 1908, Serial No. 410,733. Renewed October 19, 1909. Serial No. 523,428.

*To all whom it may concern:*

Be it known that I, MILO F. HOLBROOK, a citizen of the United States, residing at Longview, in the county of Gregg and State of Texas, have invented certain new and useful Improvements in Combination-Levels, of which the following is a specification.

My invention relates to improvements in combination levels, and has for its object the provision of a simple, practical and efficient form of level and a bevel in conjunction therewith so that the instrument may be used as a level, a square, a bevel, a measuring device for obtaining different angles of incline, for constructing figures of different shape such as polygons and the like, and which will be generally useful and desirable.

Another object of my invention is the provision of a compound plumb and spirit level, and with the foregoing and other objects in view, my invention comprises a combined plumb level and spirit level, the one serving as a check for the other, and a bevel attachment operating in conjunction with the device.

The invention further consists of a combination tool embodying certain other novel features of construction, combination and arrangement of parts substantially as disclosed herein and as illustrated in the accompanying drawings, in which:

Figure 1, is a front elevation of the invention, showing in dotted lines the manner in which the bevel is adjusted. Fig. 2, is a vertical sectional view of the same. Fig. 3, is a detached detail view of the plumb level.

In the drawings: the numeral 1, designates the block or body portion of the device, which is provided with a longitudinal seat 2, along its upper edge to receive the spirit level 3, the level being supported on the bowed spring yoke 4, and the screws 5, bearing on opposite ends of the level glass and serving to properly adjust it. The opposite edge of the block is provided with a longitudinal slot 6, therein to receive the rule or straight edge 7. The block has a central circular opening therethrough and disks or dial plates 8, serve as closures to this opening thereby providing a chamber 9, for the reception of the pendulum of the plumb or gravity level. A staff 10, is journaled between the two dial plates, the staff having a knife edge 11, to reduce friction, and the staff carries upon its opposite ends the pointers 12, which register upon the dials, the dials being properly graduated with divisions and numerals. A pendulum 13, is suspended from the staff by means of the link or connection 14, the pendulum being received in the chamber formed between the two dials as shown in Fig. 2.

In order to adapt the instrument to measuring and laying off different degrees of inclination, a rule 15 which serves as a bevel, is pivoted to the center of the front or face dial, the upper edge of the rule or blade being on a line with the pivotal center of the level staff. In order to pivot the bevel to the dial in this way, a bracket 16, may be secured to the face dial and offset therefrom, the thumb screw 17, serving to adjustably hold the bevel at the center of the dial. The rim of the face dial is preferably extended outwardly and directed angularly to form an offset annular flange 18, parallel to the body of the dial and an annular ring member 19, surrounds the flanged edge of the dial and is spaced therefrom to provide the slot 20, for the guidance of the shank of the headed bolt or stud 21, the head of such bolt being received in the channeled portion 22, beneath the annular slot. The bolt passes up through the bevel and a thumb screw 23, is engaged on the end thereof to clamp the bevel in adjusted position.

The uses and advantages of my invention will be readily apparent and it will be seen that it may be used as an ordinary try-square, as a level, and as a bevel. The plumb and spirit levels serve as a check one upon the other and when the plumb level indicates that the spirit level is out of true, it may readily be correctly adjusted by means of the set screws.

A separate rule may be furnished to be used in the slot in the level block, or when so desired, the bevel may be detached from the dial and placed in the slot for a rule.

From the foregoing description taken in connection with the drawings it will be evident that I have produced a device of the character set forth which fully and satisfactorily accomplishes all the objects herein set forth and which is practical and desirable in every way.

I claim:

1. A block, a pendulum mounted therein, a spirit tube adjustably mounted in the block, a rule slidably engaged in one edge of the block, a blade pivotally mounted, and means for clamping the blade in adjusted position.

2. A combination level and bevel comprising a pair of dial plates, a pendulum pivoted between said dial plates, a spirit tube serving in conjunction with the plumb level, a slotted annular guideway surrounding one of the dial plates, a blade pivoted to the center of one of the dial plates, and clamping means carried by the blade and received in the slotted annular guideway.

3. A compound instrument comprising a pair of dial plates, a pendulum mounted between said dial plates, a blade pivoted to the center of one of the dial plates, and means for clamping said blade in adjusted position.

In testimony whereof I affix my signature, in presence of two witnesses.

MILO FRANKLIN HOLBROOK.

Witnesses:
 DUSH SHAW,
 ABE BEHYMER.